(12) United States Patent
Kitai

(10) Patent No.: US 9,899,784 B2
(45) Date of Patent: Feb. 20, 2018

(54) MOTOR

(71) Applicant: ASMO CO., LTD., Kosai, Shizuoka-pref. (JP)

(72) Inventor: Toshiyuki Kitai, Hamamatsu (JP)

(73) Assignee: ASMO CO., LTD., Kosai (JP)

( * ) Notice: Subject to any disclaimer, the term of this patent is extended or adjusted under 35 U.S.C. 154(b) by 226 days.

(21) Appl. No.: 15/052,879

(22) Filed: Feb. 25, 2016

(65) Prior Publication Data

US 2016/0254724 A1    Sep. 1, 2016

(30) Foreign Application Priority Data

Feb. 26, 2015 (JP) ................... 2015-036283

(51) Int. Cl.
*H02K 11/00* (2016.01)
*H01R 39/36* (2006.01)
*H02K 5/14* (2006.01)
*H02K 11/026* (2016.01)

(52) U.S. Cl.
CPC ............ *H01R 39/36* (2013.01); *H02K 5/148* (2013.01); *H02K 11/026* (2013.01)

(58) Field of Classification Search
CPC ........ H02K 5/225; H02K 3/552; H01R 39/36; H01R 39/40
USPC .......................................... 310/71, 239, 240
See application file for complete search history.

(56) References Cited

U.S. PATENT DOCUMENTS

| | | | | |
|---|---|---|---|---|
| 6,992,414 B2 * | 1/2006 | Thomson | ............. | H02K 11/024 310/239 |
| 8,148,869 B2 * | 4/2012 | Kamiya | ............... | H01R 39/383 310/239 |
| 2008/0284272 A1 * | 11/2008 | Honda | ................... | H01R 11/05 310/239 |

FOREIGN PATENT DOCUMENTS

JP    2012-191792 A    10/2012

* cited by examiner

*Primary Examiner* — Hanh Nguyen
(74) *Attorney, Agent, or Firm* — SOLARIS Intellectual Property Group, PLLC

(57) ABSTRACT

There is provided a motor, the motor comprising (1) a brush unit that is provided at one axial direction side of a motor main body, and that includes a first brush and a second brush, (2) a pair of power supply terminals that are provided at the brush unit, that are respectively electrically connected to either the first brush or the second brush, and that include connector connection portions to which external connectors connect and that extend out toward another axial direction side of the motor main body at respective other end sides of the power supply terminals, and (3) a pair of element connection portions that are respectively provided at the other end sides of the power supply terminals, and that are disposed offset from each other in the radial direction of the motor main body.

2 Claims, 4 Drawing Sheets ated offset
MOTOR

CROSS-REFERENCE TO RELATED APPLICATION

This application claims priority under 35 USC 119 from Japanese Patent application No. 2015-036283 filed on Feb. 26, 2015, the disclosure of which is incorporated by reference herein.

BACKGROUND

Technical Field

The present disclosure relates to a motor having a power supply terminal to which an electrical element is connected.

Related Art

In a motor described by Japanese Patent Application Laid-Open (JP-A) No. 2012-191792, pairs of terminals (power supply terminals) that supply electrical power to a brush from external connectors are configured as first terminals and second terminals, respectively. Moreover, an overvoltage suppressing varistor (electrical element) is connected across the first terminals out of the pairs of terminals.

However, in the motor described by JP-A No. 2012-191792, the varistor (electrical element) is disposed at the radial direction outside of a rotation shaft of the motor. Moreover, the first pair of terminals is formed with respective element connection portions, and the element connection portions are disposed facing a direction orthogonal to the radial direction of the motor, as viewed along the axial direction of the motor. In addition to disposing the varistor across the pair of first terminals, legs of the varistor are bent toward the element connection portion side. Namely, the legs of the varistor are bent in a direction so as to separate away from each other. The need to bend the legs of the varistor results in increased labor, and there is a need for manage the angle, etc. of the bent legs. Moreover, since the legs of the varistor are bent in a direction so as to separate away from each other, the mounting space of the varistor as viewed along the axial direction of the motor increases, leading to the motor increasing in size.

SUMMARY

In consideration of the above particulars, the present disclosure provides a motor capable of suppressing the mounting space for electrical elements from increasing in size, while suppressing an increase in labor.

A first aspect of the present disclosure is a motor including: a brush unit that is provided at one axial direction side of a motor main body, and that is includes a first brush and a second brush that abut a commutator of the motor main body; a pair of power supply terminals that are provided at the brush unit, that are respectively electrically connected to either the first brush or the second brush forming a pair at one end sides of the power supply terminals, and that include connector connection portions to which external connectors connect and that extend out toward another axial direction side of the motor main body at respective other end sides of the power supply terminals; and a pair of element connection portions that are respectively provided at the other end sides of the power supply terminals, that extend out from the respective power supply terminals toward the one axial direction side of the motor main body with a radial direction of the motor main body as a plate thickness direction, that each include a groove portion into which a leg of an electrical element is press-fitted from the one axial direction side of the motor main body, and that are disposed offset from each other in the radial direction of the motor main body, as viewed along the axial direction of the motor main body.

According to the first aspect above, the brush unit is provided at the one axial direction side of the motor main body, and the brush unit is configured including the first brush and the second brush that abut the commutator of the motor main body. Moreover, the pair of power supply terminals are provided at the brush unit, and the pair of power supply terminals are respectively electrically connected to either the first brush or the second brush forming a pair at the one end side of the power supply terminals. Moreover, the pair of power supply terminals include connector connection portions to which the external connectors connect and that extend out toward the other axial direction side of the motor main body at the respective other end portions of the power supply terminals.

Moreover, the respective element connection portions are provided at the other end portions of the pair of power supply terminals. The element connection portions extend out from the respective power supply terminals toward the one axial direction side of the motor main body with the radial direction of the motor main body as the plate thickness direction. The element connection portions include the groove portion, and the legs of the electrical element are press-fitted inside each of the groove portions from the one axial direction side of the motor main body. The electrical element is thereby connected to the pair of power supply terminals.

The pair of element connection portions are disposed offset from each other in the radial direction of the motor main body as viewed along the axial direction of the motor main body. Namely, the pair of element connection portions are disposed separated in the radial direction of the motor main body. The pair of element connection portions can thus be disposed corresponding to the distance between legs of the electrical element such that the pair of element connection portions do not interfere with each other. The need to bend the legs of the electrical element can thereby be dispensed with. Moreover, the mounting space for the electrical element or the pair of element connection portions can be made more compact than in cases in which the positions of the pair of element connection portions match in the radial direction of the motor main body.

A second aspect of the present disclosure is the motor of the first aspect, wherein: an element main body portion of the electrical element is disposed toward a motor main body radial direction inside with respect to the pair of element connection portions, as viewed along the axial direction of the motor main body; and the legs of the electrical element extend out from an element main body portion toward the radial direction outside of the motor main body.

According to the second aspect above, an element main body portion of the electrical element is disposed at the radial direction inside of the motor main body with respect to the pair of element connection portions. Thus, the motor can be suppressed from increasing in size toward the radial direction outside more than in cases in which the element main body portion is disposed at the radial direction outside of the motor main body.

BRIEF DESCRIPTION OF THE DRAWINGS

Exemplary embodiments of the present disclosure will be described in detail based in the following figures, wherein.

DETAILED DESCRIPTION

Figure 2:
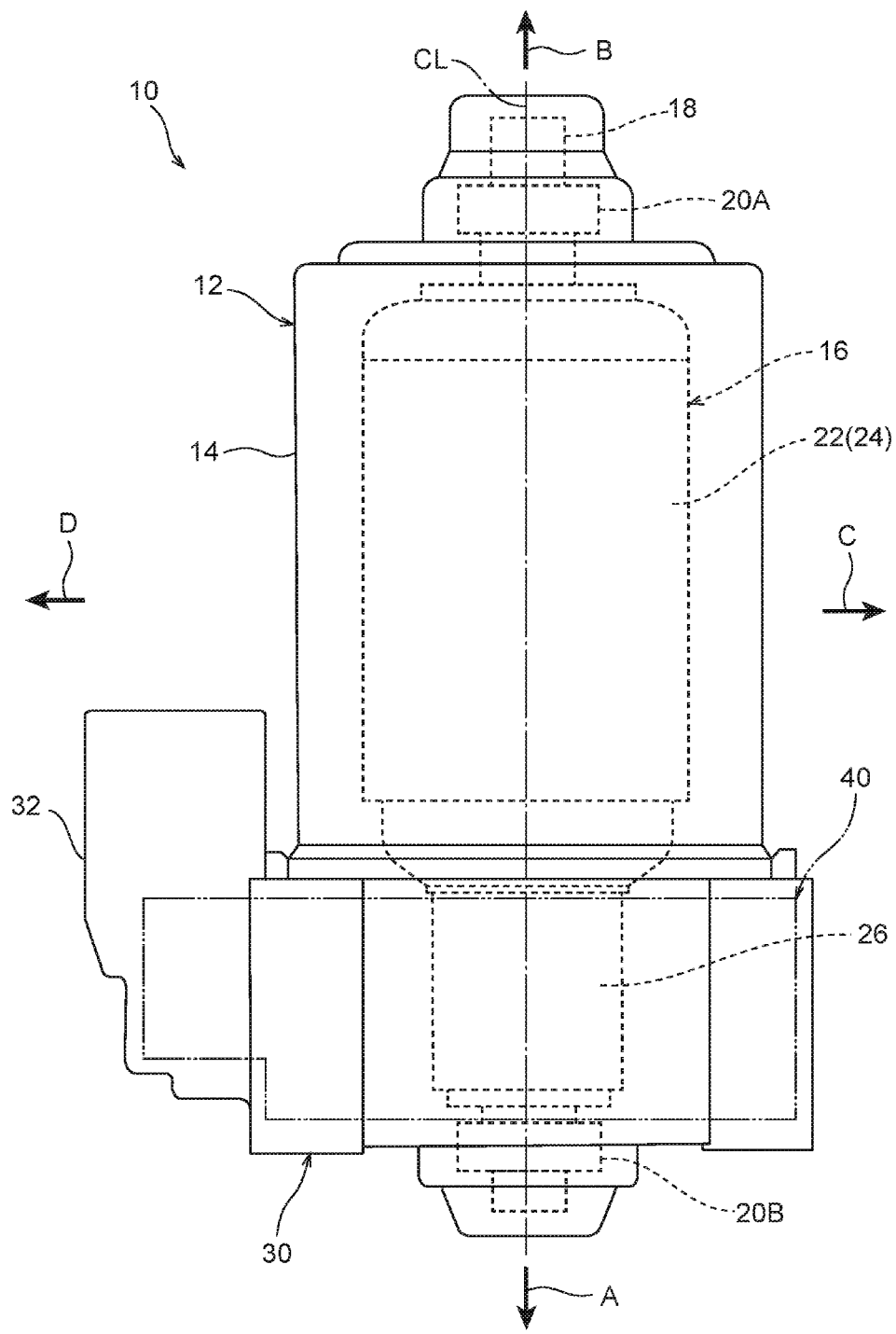
FIG. 2 is an overall side view schematically illustrating a motor according to an exemplary embodiment.

Explanation follows regarding a motor 10 according to an exemplary embodiment, with reference to the drawings. The motor 10 is, for example, employed as a drive source for a power window unit, a sunroof unit, or the like of a vehicle (automobile). As illustrated in FIG. 2, the motor 10 is configured including a motor main body 12 and a brush unit 40 provided at one axial direction side of the motor main body 12. Note that the arrow A illustrated in the drawings indicates one axial direction side of the motor main body 12, and the arrow B indicates the other axial direction side of the motor main body 12. In the following explanation, the one axial direction side of the motor main body 12 is denoted the lower side, and the other axial direction side of the motor main body 12 is denoted the upper side.

The motor main body 12 is configured as what is known as a brushed DC motor. The motor main body 12 includes a bottomed, substantially circular cylinder shaped motor yoke 14 that is open at the lower side. Plural permanent magnets (omitted from illustration in the drawings) are fixed to the inner circumferential face of the motor yoke 14, and the permanent magnets are disposed such that their magnetic poles alternate along the circumferential direction of the motor yoke 14.

An armature 16 is housed in the motor yoke 14, at the inside of the permanent magnets, so as to be rotatable. The armature 16 is configured including a rotation shaft 18, an armature core 22, an armature coil 24, and a commutator 26. The rotation shaft 18 is formed substantially round-bar shaped, and is disposed coaxially to the motor yoke 14. An upper end portion of the rotation shaft 18 is supported at a bottom portion of the motor yoke 14 through a shaft bearing 20A so as to be rotatable. A lower side portion of the rotation shaft 18 projects downward from an opening portion of the motor yoke 14, and a lower end portion of the rotation shaft 18 is supported in a housing 30, described later, through a shaft bearing 20B so as to be rotatable.

The armature core 22 is disposed inside the motor yoke 14 and is fixed to the rotation shaft 18. The armature core 22 is formed by stacking plural sheet shaped iron core plates having plural teeth. The armature core 22 includes plural slots disposed at intervals of equal angle, and the armature coil 24 is formed by overlapping successive windings at each given slot of the armature core 22.

The commutator 26 is formed substantially circular cylinder shaped, and is disposed at the lower side of the motor yoke 14, and is fixed to the rotation shaft 18 at the lower side of the armature core 22. The commutator 26 includes plural commutator pieces, and the commutator pieces are disposed in a row in a state in which the commutator pieces are electrically insulated from each other along the circumferential direction of the commutator 26. The windings wound onto each given slot of the armature coil 24 are electrically connected to each commutator piece in succession.

The housing 30 is fixed to an opening portion of the motor main body 12, and the opening portion of the motor main body 12 is closed off by the housing 30 in a state in which the lower side portion of the rotation shaft 18 and the commutator 26 are housed inside the housing 30. A connector housing portion 32 is integrally formed to the housing 30, and external connectors (omitted from illustration in the drawings) for supplying power to a first brush 50 and a second brush 52, described later, are fitted into the connector housing portion 32. The connector housing portion 32 projects from the housing 30 toward the radial direction outside of the motor main body 12, and also projects upward. Namely, an upper portion of the connector housing portion 32 is disposed adjacent to the radial direction outside of the motor yoke 14.

Figure 4:
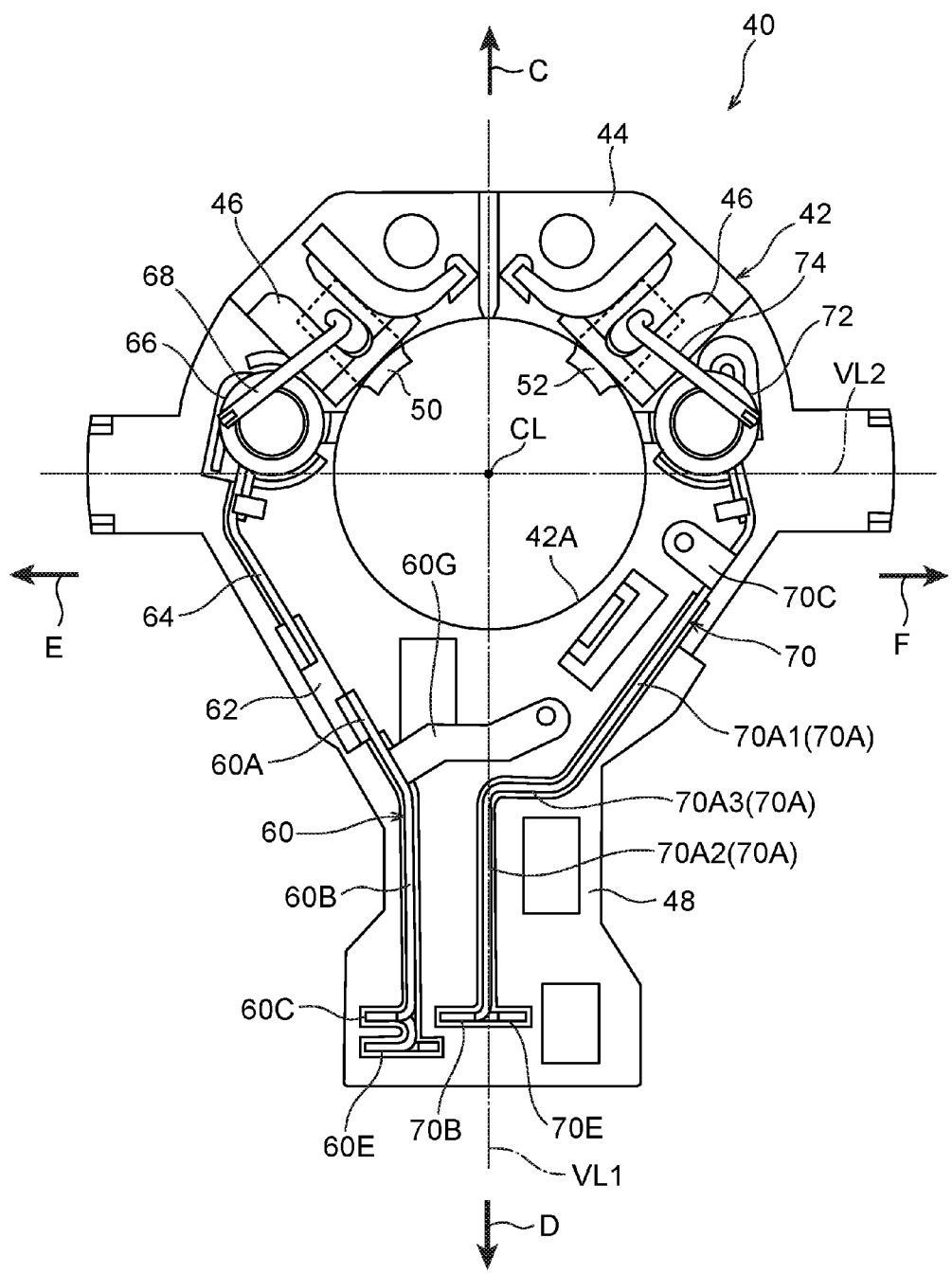
FIG. 4 is a plan view of the brush unit illustrated in FIG. 1, as viewed from the other axial direction side of the motor main body.

The brush unit 40 is disposed at the radial direction outside of the commutator 26, and is housed and supported inside the housing 30. Explanation follows regarding the brush unit 40. As illustrated in FIG. 4, the brush unit 40 is configured including a base plate 42, a pair of the first brush 50 and the second brush 52, a first power supply terminal 60 serving as a "power supply terminal", and a second power supply terminal 70 serving as a "power supply terminal".

In the following explanation, an orthogonal direction orthogonal to the axial direction (vertical direction) of the motor main body 12 as viewed along the axial direction of the motor main body 12 (the arrow C direction and the arrow D direction in FIG. 4) is denoted the first direction, the arrow C direction in FIG. 4 is taken as one first direction side, and the arrow D direction in FIG. 4 is taken as the other first direction side. Moreover, a hypothetical line extending through a shaft line CL of the motor main body 12 and along the first direction as viewed along the axial direction of the motor main body 12 is denoted a first orthogonal line VL1. An orthogonal direction orthogonal to the first direction as viewed along the axial direction of the motor main body 12 (the arrow E direction and the arrow F direction in FIG. 4) is denoted a second direction, and the arrow E direction in FIG. 4 is taken as one second direction side, and the arrow F direction in FIG. 4 is taken as the other second direction side. A hypothetical line extending through the shaft line CL of the motor main body 12 and along the second direction as viewed along the axial direction of the motor main body 12 is denoted a second orthogonal line VL2. The connector housing portion 32 described above (see FIG. 2) thus projects toward the other first direction side with respect to the motor main body 12.

Figure 3:
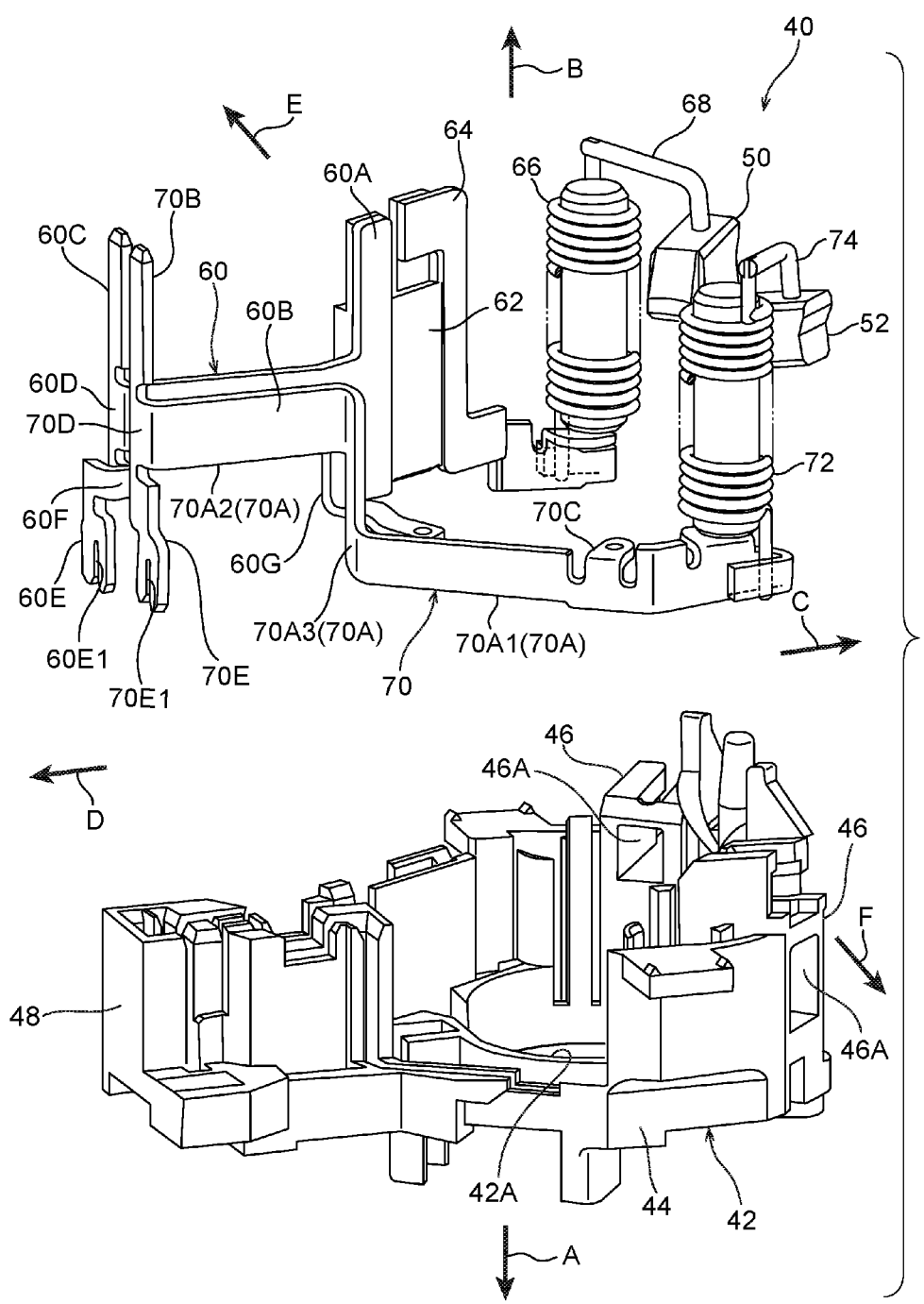
FIG. 3 is an exploded perspective view illustrating a state in which the brush unit illustrated in FIG. 1 is dissembled.

As illustrated in FIG. 3 and FIG. 4, the base plate 42 is produced using an insulating material (resin). The base plate 42 includes a substantially ring shaped base portion 44 having a penetration hole 42A at the axial center thereof. The base portion 44 is disposed coaxially to the motor main body 12 (the rotation shaft 18), and the commutator 26, described above, is disposed inside the penetration hole 42A.

A pair of brush holders 46 is integrally provided at a portion of the base portion 44 at the one first direction side with respect to the second orthogonal line VL2. The pair of brush holders 46 are disposed at positions with line symmetry across the first orthogonal line VL1 (see FIG. 4). The pair of brush holders 46 are formed in substantially rectangular column shapes, and disposed extending up toward the upper side of the base portion 44. Brush holder portions 46A (see FIG. 3) are formed in the pair of brush holders 46, and each brush holder portion 46A is formed with a substantially rectangular cross-section and formed penetrating through the base portion 44 along the radial direction thereof. The pair of the first brush 50 and the second brush 52 are respectively housed inside the brush holder portions 46A so as to be capable of moving in the radial directions of the base portion 44. The first brush 50 and the second brush 52 are biased toward the radial direction inside of the base portion 44 (the rotation shaft 18) by a torque spring, not illustrated, and abut the commutator 26 so as to enable sliding contact.

The base plate 42 includes a connector portion 48, and the connector portion 48 extends out toward the other first direction side from the base portion 44. A leading end portion of the connector portion 48 is housed inside the connector housing portion 32 of the housing 30, described above.

The first power supply terminal 60 is disposed at the upper side of the base plate 42 and is assembled to the base plate 42. The first power supply terminal 60 is disposed toward the one second direction side with respect to the first orthogonal line VL1, and generally extends in the first direction. More specifically, the first power supply terminal 60 is configured including a first connection portion 60A that configures one end portion (an end portion at the one first direction side) of the first power supply terminal 60, a first terminal main body portion 60B that configures a length direction intermediate portion of the first power supply terminal 60, and a first connector connection portion 60C that serves as a "connector connection portion" configuring another end portion (an end portion at the other first direction side) of the first power supply terminal 60.

The first connection portion 60A is disposed at the other first direction side of the first brush 50 as viewed from above, is disposed such that the plate thickness direction of the first connection portion 60A is substantially the radial direction of the base portion 44, and the first connection portion 60A extends in the vertical direction. A thermistor 62 is connected to the first connection portion 60A, and the thermistor 62 is connected, through a relay terminal 64 and a choke coil 66, to a first pigtail 68 provided at the first brush 50. The first brush 50 and the first power supply terminal 60 thereby form a pair, and one end side of the first power supply terminal 60 is electrically connected to the first brush 50. The first brush 50 and an external connector are connected by the first power supply terminal 60. Note that the thermistor 62, the relay terminal 64, and the choke coil 66 are assembled to the base plate 42 at the upper side of the base portion 44.

As illustrated in FIG. 3, with the width direction of the first terminal main body portion 60B as the vertical direction, the first terminal main body portion 60B extends out from a vertical direction intermediate portion of the first connection portion 60A toward the other first direction side and toward the other second direction side. A base end side of the first terminal main body portion 60B then bends toward the one first direction side, and another end side portion of the first terminal main body portion 60B extends in the first direction at the upper side of the connector portion 48 of the base plate 42. A first bent portion 60D is formed at the other end portion of the first power supply terminal 60, and the first bent portion 60D is bent into a substantial right angle toward the one second direction side as viewed from the upper side of the first bent portion 60D.

The first connector connection portion 60C extends out upwards from the first bent portion 60D, and is disposed inside the connector housing portion 32 of the housing 30 described above. The first connector connection portion 60C therefore extends in the vertical direction such that the first direction is in the plate thickness direction thereof, and configuration is such that a terminal of the external connector fitted into the connector housing portion 32 connects to the first connector connection portion 60C.

A noise prevention element connection portion 60E is integrally formed to the other end portion of the first power supply terminal 60, and serves as an "element connection portion" that connects to legs 84 of a varistor 80, described below. The noise prevention element connection portion 60E is below the first bent portion 60D, extends in the vertical direction with the plate thickness direction of the noise prevention element connection portion 60E as the first direction, and projects downward from the connector portion 48 (see FIG. 1). More specifically, a continuous portion 60F is integrally formed to an upper end portion of the noise prevention element connection portion 60E, and the continuous portion 60F is bent in a substantial U shape open toward the one second direction side as viewed from above, and extends out from the upper end portion of the noise prevention element connection portion 60E toward the one first direction side and toward the one second direction side. The continuous portion 60F is thereby connected to the lower end of the first bent portion 60D. The noise prevention element connection portion 60E is thereby disposed offset from the first connector connection portion 60C toward the other first direction side (see FIG. 4). Moreover, a first connection groove 60E1 serving as a "groove portion" open toward the lower side is formed in a leading end portion (lower end portion) of the noise prevention element connection portion 60E.

A noise prevention element connection portion 60G is formed at a base end portion (one end portion) of the first terminal main body portion 60B. The noise prevention element connection portion 60G extends out downward from the first terminal main body portion 60B, and at a length direction intermediate portion thereof bends substantially toward the other second direction side. A lower end portion of the noise prevention element connection portion 60G is disposed at the upper side of the base portion 44, with the vertical direction as the plate thickness direction of the noise prevention element connection portion 60G As illustrated in FIG. 3 and FIG. 4, the second power supply terminal 70 is disposed at the upper side of the base plate 42 and is assembled to the base plate 42. The second power supply terminal 70 generally extends in the first direction, and is disposed at the other second direction side of the first orthogonal line VL1 with the exception of a portion of the second power supply terminal 70 at the other first direction side (see FIG. 4). More specifically, the second power supply terminal 70 is configured including a second terminal main body portion 70A generally extending in the first direction, and a second connector connection portion 70B serving as a "connector connection portion" that configures another end portion of the second power supply terminal 70.

The second terminal main body portion 70A is configured including a main body piece 70A1 that configures a portion at one end side of the second terminal main body portion 70A (a portion at the one first direction side), and a main body piece 70A2 that configures a portion at the other end side of the second terminal main body portion 70A (a portion at the other first direction end side).

As illustrated in FIG. 3, the main body piece 70A1 extends substantially along the circumferential direction of the base portion 44 with the width direction of the main body piece 70A1 in the vertical direction. More specifically, main body piece 70A1 is disposed angled so as to approach the first orthogonal line VL1 on progression toward the other first direction side as viewed from above (see FIG. 4). A bent portion bending toward the radial direction inside of the base portion 44 is formed at one end portion of the main body piece 70A1 at one width direction side (upper side) end portion of the main body piece 70A1, and a choke coil 72 is disposed at the bent portion. Moreover, a connection portion that bends back on itself in a substantial U shape is formed at the one end portion of the main body piece 70A1, and one end portion of the choke coil 72 is connected to the connection portion. Another end portion of the choke coil 72 connects to a second pigtail 74 provided at the second brush 52. The second brush 52 and the second power supply terminal 70 thereby form a pair, and the second power supply terminal 70 is electrically connected to the second brush 52 at one end side.

Figure 1:
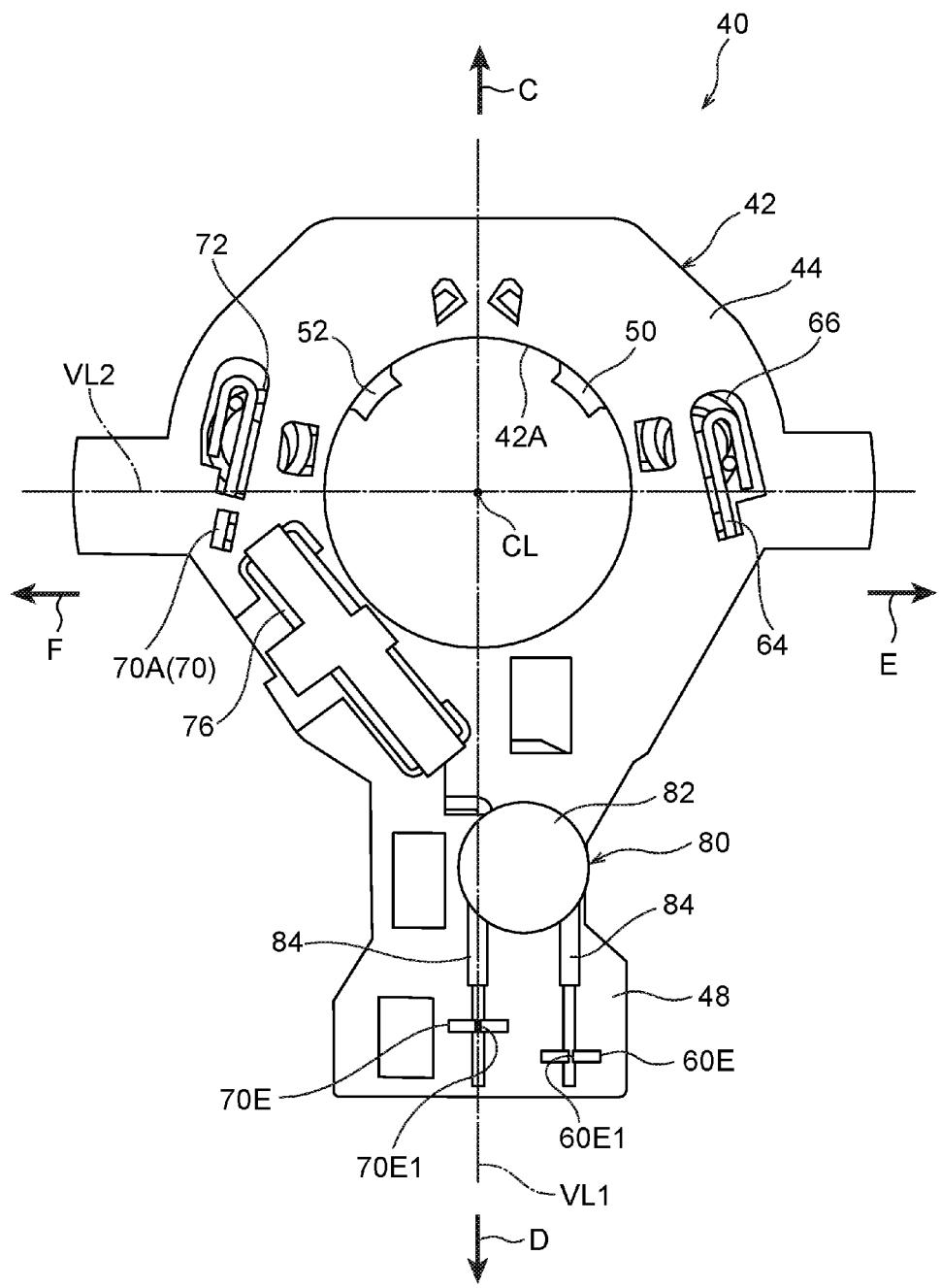
FIG. 1 is a lower face view of a brush unit employed in a motor according to an exemplary embodiment, as viewed from one axial direction side of a motor main body.

A noise prevention element connection portion 70C is formed at the one end portion of the main body piece 70A1 at a position toward the other first direction side with respect to the choke coil 72. The noise prevention element connection portion 70C bends substantially toward the radial direction inside of the base portion 44 at the one width direction side (upper side) end portion of the main body piece 70A1. Legs of a capacitor 76 (broadly speaking, an element understood to be an "electrical element (noise prevention element)") connect to respective leading end portions of the noise prevention element connection portion 60G of the first power supply terminal 60 and the noise prevention element connection portion 70C of the second power supply terminal 70 described above. More specifically, as illustrated in FIG. 1, the capacitor 76 is assembled to the base portion 44 from the lower side of the base plate 42, and leading end portions of the legs of the capacitor 76 project out upward from the base portion 44. The projecting legs of the capacitor 76 are thereby connected to the noise prevention element connection portion 60G and the noise prevention element connection portion 70C. The capacitor 76 thereby connects the first power supply terminal 60 and the second power supply terminal 70 together, between the external connectors, and the first brush 50 and second brush 52 pair.

As illustrated in FIG. 3, the main body piece 70A2 is disposed at the other second direction side of the first terminal main body portion 60B of the first power supply terminal 60, with the second direction as the plate thickness direction of the main body piece 70A2, and extends in the first direction. Moreover, the main body piece 70A2 is disposed at the upper side of the main body piece 70A1, and is disposed so as to face a portion of the other end side of the first terminal main body portion 60B in the second direction.

The second terminal main body portion 70A includes a linking piece 70A3 for linking the main body piece 70A1 and the main body piece 70A2 together, and the linking piece 70A3 extends in the vertical direction with the first direction as the plate thickness direction of the linking piece 70A3. Another end portion of the main body piece 70A1 is thereby connected to the lower end portion of the linking piece 70A3, and one end portion of the main body piece 70A2 is connected to the upper end portion of the linking piece 70A3. Moreover, a second bent portion 70D is formed to another end portion of the second terminal main body portion 70A (the main body piece 70A2), and the second bent portion 70D bends toward the one second direction side in substantially a right angle as viewed from above.

The second connector connection portion 70B extends out upward from the second bent portion 70D, and is disposed inside the connector housing portion 32 of the housing 30 described above. The second connector connection portion 70B therefore extends in the vertical direction such that the first direction is in the plate thickness direction thereof, and configuration is such that a terminal of an external connector fitted into the connector housing portion 32 is connected to the second connector connection portion 70B. Moreover, the first connector connection portion 60C and the second connector connection portion 70B are disposed in a row in the second direction. Namely, the position of the first connector connection portion 60C and the position of the second connector connection portion 70B are set so as to match in the first direction.

Moreover, a noise prevention element connection portion 70E is integrally formed to the other end portion of the second power supply terminal 70, and serves as an "element connection portion" that connects to the legs 84 of the varistor 80, described below. The noise prevention element connection portion 70E extends out downward from the second bent portion 70D, and projects toward the lower side of the connector portion 48 of the base plate 42. The noise prevention element connection portion 70E is disposed such that the first direction is the plate thickness direction thereof, and is disposed offset (separated) from the noise prevention element connection portion 60E of the first power supply terminal 60 toward the one first direction side. Moreover, a second connection groove 70E1, serving as a "groove" open at the lower side, is formed in a leading end portion (lower end portion) of the noise prevention element connection portion 70E. The distance between the first connection groove 60E1 and the second connection groove 70E1 along the second direction is thereby set so as to match the distance between the pair of legs of the varistor 80, described below.

Moreover, as illustrated in FIG. 1, the brush unit 40 includes the varistor 80 serving as an "electrical element (noise prevention element)". The varistor 80 is disposed at the lower side of the connector portion 48 of the base plate 42. The varistor 80 is configured including a substantially flat circular shaped element main body portion 82, and the pair of legs 84 that extend out from the element main body portion 82. The element main body portion 82 of the varistor 80 is disposed toward the one first direction side (the radial direction inside of the motor main body 12) with respect to the noise prevention element connection portion 60E and the noise prevention element connection portion 70E. The legs 84 of the varistor 80 extend out from the element main body portion 82 toward the other first direction side (the radial direction outside of the motor main body 12) and are disposed in a row along the second direction. One of the legs 84 is thereby press-fitted inside the first connection groove 60E1 of the noise prevention element connection portion 60E, and the other leg 84 is press-fitted inside the second connection groove 70E1 of the noise prevention element connection portion 70E. The varistor 80 thereby connects the first power supply terminal 60 and the second power supply terminal 70 together, between the external connectors, and the first brush 50 and second brush 52 pair.

Next, explanation follows regarding operation of the present exemplary embodiment.

In the motor 10 configured as described above, fitting external connectors into the connector housing portion of the motor 10 connects the terminals of the external connectors to the first connector connection portion 60C of the first power supply terminal 60 and the second connector connection portion 70B of the second power supply terminal 70. The external connectors are thereby electrically connected to the first brush 50 and the second brush 52 by the first power supply terminal 60 and the second power supply terminal 70, such that power is supplied to the first brush 50 and the second brush 52.

Moreover, the varistor 80 and the capacitor 76 that connect the first power supply terminal 60 and the second power supply terminal 70 together are provided between the external connectors, and the first brush 50 and the second brush 52. More specifically, the noise prevention element connection portion 60E is provided at the other end portion of the first power supply terminal 60, and the noise prevention element connection portion 60E extends out downward from the first terminal main body portion 60B with the plate thickness direction of the noise prevention element connection portion 60E as the first direction. Moreover, the noise prevention element connection portion 70E is provided at the other end portion of the second power supply terminal 70, and the noise prevention element connection portion 70E extends out from the main body piece 70A2 of the second terminal main body portion 70A with the plate thickness direction of the noise prevention element connection portion 70E as the first direction. The legs 84 of the varistor 80 are thereby press-fitted, from the lower side, inside the first connection groove 60E1 of the noise prevention element connection portion 60E and inside the second connection groove 70E1 of the noise prevention element connection portion 70E. Moreover, the legs of the capacitor 76 are connected to the respective leading end portions of the noise prevention element connection portion 60G of the first power supply terminal 60 and the noise prevention element connection portion 70C of the second power supply terminal 70. The occurrence of noise when the motor 10 is driven is therefore suppressed by the varistor 80 and the capacitor 76.

Herein, in the motor 10, the noise prevention element connection portion 70E of the second power supply terminal 70 is disposed offset (separated) from the noise prevention element connection portion 60E of the first power supply terminal 60 toward the other first direction side (the radial direction inside of the motor main body 12). Namely, the noise prevention element connection portion 70E and the noise prevention element connection portion 60E are not disposed in a row along the second direction as viewed along the axial direction of the motor main body 12. Thus, in cases in which the distance between the legs 84 of the varistor 80 is short, the noise prevention element connection portion 60E and the noise prevention element connection portion 70E can be disposed corresponding to the distance between the legs 84 of the varistor 80 such that the noise prevention element connection portion 60E and the noise prevention element connection portion 70E do not interfere with each other.

In regard to this point, explanation follows regarding a comparison to a comparative example in which the noise prevention element connection portion 60E and the noise prevention element connection portion 70E are disposed in a row along the second direction. Namely, when the noise prevention element connection portion 60E and the noise prevention element connection portion 70E are disposed in a row along the second direction, the noise prevention element connection portion 60E and the noise prevention element connection portion 70E need to be disposed separated from each other along the second direction so that the two do not interfere with each other. Moreover, the noise prevention element connection portion 60E and the noise prevention element connection portion 70E are disposed such that the first direction is the plate thickness directions thereof, and the first connection groove 60E1 and the second connection groove 70E1 are respectively formed in the leading end portions (lower end portions) of the noise prevention element connection portion 60E and the noise prevention element connection portion 70E. The width dimensions (second direction dimensions) of the noise prevention element connection portion 60E and the noise prevention element connection portion 70E therefore need to be a predetermined dimension or greater from the viewpoint of manufacturing constraints and the like. The distance between the first connection groove 60E1 and the second connection groove 70E1 along the second direction is therefore sometimes greater than the distance between the legs 84 of the varistor 80. In such cases, bending or the like needs to be carried out on the legs 84 of the varistor 80 such that the distance between the legs 84 of the varistor 80 is increased. As a result, there is an increase in labor, and the mounting space for the varistor 80 or for the noise prevention element connection portion 60E and the noise prevention element connection portion 70E increases along the second direction.

In contrast, in the present exemplary embodiment, the noise prevention element connection portion 70E is disposed offset (separated) from the noise prevention element connection portion 60E toward other first direction side (the radial direction inside of the motor main body 12). The noise prevention element connection portion 60E and the noise prevention element connection portion 70E can therefore be disposed closer together in the second direction than in the comparative example. As a result, the noise prevention element connection portion 60E and the noise prevention element connection portion 70E can be disposed so as to correspond to the distance between the legs 84 of the varistor 80 such that the noise prevention element connection portion 60E and the noise prevention element connection portion 70E do not interfere with each other. Thus, the legs 84 of the varistor 80 can be press-fitted inside the first connection groove 60E1 and the second connection groove 70E1 without causing the legs 84 of the varistor 80 to bend as in the comparative example above. Moreover, the mounting space for the noise prevention element connection portion 60E and the noise prevention element connection portion 70E along the second direction can be made smaller than in the comparative example above. Accordingly, the mounting space of the varistor 80 or the noise prevention element connection portion 60E and the noise prevention element connection portion 70E can be suppressed from increasing in size, while suppressing an increase in labor. Moreover, an increase in cost of the motor 10 can be suppressed since there is no need to bend the legs 84 of the varistor 80.

Moreover, the first connector connection portion 60C that configures the other end portion of the first power supply terminal 60 extends out from the first terminal main body portion 60B toward the upper side. The noise prevention element connection portion 60E of the first power supply terminal 60 therefore extends out toward the side opposite to the extension direction of the first connector connection portion 60C, at the lower side of the first connector connection portion 60C. Moreover, the second connector connection portion 70B that configures the other end portion of the second power supply terminal 70 extends out upward from the main body piece 70A2 of the second terminal main body portion 70A. The noise prevention element connection portion 70E of the second power supply terminal 70 therefore extends out toward the side opposite to the extension direction of the second connector connection portion 70B, at the lower side of the second connector connection portion 70B. A space at the lower side of the connector portion 48 of the base plate 42 can thereby be effectively utilized to dispose the varistor 80, and the varistor 80 can be connected to the first power supply terminal 60 and the second power supply terminal 70.

In the first power supply terminal 60, the first connector connection portion 60C and the noise prevention element connection portion 60E are configured so as to extend in the vertical direction, and in the second power supply terminal 70, the second connector connection portion 70B and the noise prevention element connection portion 70E are configured so as to extend in the vertical direction. Namely, the first connector connection portion 60C and the noise prevention element connection portion 60E (the second connector connection portion 70B and the noise prevention element connection portion 70E) can be consolidated so as to extend in the vertical direction. The first power supply terminal 60, the second power supply terminal 70, and the base plate 42 can thereby be suppressed from becoming complicated in structure.

The element main body portion 82 of the varistor 80 is disposed toward the one first direction side (the radial direction inside of the motor main body 12) with respect to the noise prevention element connection portion 60E and the noise prevention element connection portion 70E as viewed along the axial direction of the motor main body 12. The legs 84 of the varistor 80 extend out from the element main body portion 82 toward the other first direction side (the radial direction outside of the motor main body), and the legs 84 are press-fitted inside the first connection groove 60E1 and the second connection groove 70E1. The motor 10 can therefore be made more compact along the radial direction of the motor main body 12 than in cases in which the element main body portion 82 is disposed toward the other first direction side (the radial direction outside of the motor main body 12) with respect to the noise prevention element connection portion 60E and the noise prevention element connection portion 70E.

Explanation follows regarding this point. The respective positions of the first connector connection portion 60C of the first power supply terminal 60, the second connector connection portion 70B of the second power supply terminal 70, and the motor main body 12 are set in accordance with the vehicle layout or the position of the external connectors to which the motor 10 is to be mounted. In other words, changes to the positions of the first connector connection portion 60C, the second connector connection portion 70B, and the motor main body 12 are restricted. In cases in which the element main body portion 82 is disposed toward the other first direction side (the radial direction outside of the motor main body 12) with respect to the noise prevention element connection portion 60E and the noise prevention element connection portion 70E, the connector portion 48 of the base plate 42 therefore extends further toward the other first direction side than in the present exemplary embodiment. The motor 10 is thereby made large toward the radial direction outside of the motor main body 12. In contrast, in the present exemplary embodiment, the element main body portion 82 of the varistor 80 is disposed toward the one first direction side with respect to the noise prevention element connection portion 60E and the noise prevention element connection portion 70E, and the motor 10 can be made more compact along the radial direction of the motor main body 12 compared to the above case.

In the present exemplary embodiment, the noise prevention element connection portion 60E extends out from the first terminal main body portion 60B at the lower side of the first connector connection portion 60C, and the noise prevention element connection portion 70E extends out downward from the second terminal main body portion 70A at the lower side of the second connector connection portion 70B. In addition, the noise prevention element connection portion 60E may be disposed toward the one first direction side with respect to the first connector connection portion 60C, and may extend out downward from the first terminal main body portion 60B. Moreover, the noise prevention element connection portion 70E may be disposed toward the one first direction side with respect to the second connector connection portion 70B, and may extend out downward from the second terminal main body portion 70A. In such cases, as viewed along the axial direction of the motor main body 12, the element main body portion 82 of the varistor 80 may be disposed toward the other first direction side with respect to the noise prevention element connection portion 60E and the noise prevention element connection portion 70E, the legs 84 of the varistor 80 may extend out from the element main body portion 82 toward the one first direction side, and the legs 84 may be press-fitted inside the first connection groove 60E1 and the second connection groove 70E1.

Moreover, although the varistor 80 is connected to the noise prevention element connection portion 60E and the noise prevention element connection portion 70E in the present exemplary embodiment, a capacitor may be configured to connect to the noise prevention element connection portion 60E and the noise prevention element connection portion 70E.

What is claimed is:

1. A motor comprising:
   a brush unit that is provided at one axial direction side of a motor main body, and that includes a first brush and a second brush that abut a commutator of the motor main body;
   a pair of power supply terminals that are provided at the brush unit, that are respectively electrically connected to either the first brush or the second brush forming a pair at one end sides of the power supply terminals, and that include connector connection portions to which external connectors connect and that extend out toward another axial direction side of the motor main body at respective other end sides of the power supply terminals; and
   a pair of element connection portions that are respectively provided at the other end sides of the power supply terminals, that extend out from the respective power supply terminals toward the one axial direction side of the motor main body with a radial direction of the motor main body as a plate thickness direction, that each include a groove portion into which a leg of an electrical element is press-fitted from the one axial direction side of the motor main body, and that are disposed offset from each other in the radial direction of the motor main body, as viewed along the axial direction of the motor main body.

2. The motor of claim 1, wherein:
   an element main body portion of the electrical element is disposed toward a motor main body radial direction inside with respect to the pair of element connection portions, as viewed along the axial direction of the motor main body; and
   the legs of the electrical element extend out from the element main body portion toward a radial direction outside of the motor main body.

\* \* \* \* \*